(12) United States Patent
Kreft

(10) Patent No.: US 10,882,148 B2
(45) Date of Patent: Jan. 5, 2021

(54) PIVOT UNIT

(71) Applicant: G. Scott Kreft, Raleigh, NC (US)

(72) Inventor: G. Scott Kreft, Raleigh, NC (US)

(73) Assignee: Caromation, Inc., Raleigh, NC (US)

( * ) Notice: Subject to any disclaimer, the term of this patent is extended or adjusted under 35 U.S.C. 154(b) by 396 days.

(21) Appl. No.: 16/051,256

(22) Filed: Jul. 31, 2018

(65) Prior Publication Data

US 2019/0039195 A1 Feb. 7, 2019

Related U.S. Application Data

(60) Provisional application No. 62/539,789, filed on Aug. 1, 2017.

(51) Int. Cl.
*B23Q 1/00* (2006.01)
*B23Q 1/52* (2006.01)
*B23Q 5/26* (2006.01)

(52) U.S. Cl.
CPC ............... *B23Q 1/52* (2013.01); *B23Q 1/525* (2013.01); *B23Q 5/26* (2013.01)

(58) Field of Classification Search
CPC .... B25B 1/04; B25B 1/14; B25B 3/00; B23Q 3/00; B23Q 3/06; B23Q 3/152; B23Q 1/03

See application file for complete search history.

(56) References Cited

U.S. PATENT DOCUMENTS

| | | | | |
|---|---|---|---|---|
| 6,199,846 B1* | 3/2001 | Crorey | ............... | B23K 37/0435 269/233 |
| 7,467,788 B2* | 12/2008 | McIntosh | ................ | B25B 5/062 269/24 |
| 2004/0046299 A1* | 3/2004 | Migliori | .................... | B25B 5/12 269/32 |
| 2010/0044942 A1* | 2/2010 | Tamai | ..................... | B25B 5/125 269/32 |
| 2019/0039195 A1* | 2/2019 | Kreft | ..................... | B23Q 1/525 |

* cited by examiner

*Primary Examiner* — Lee D Wilson
(74) *Attorney, Agent, or Firm* — Panagos Kennedy PLLC; Daniel Checkowsky; Linda Kennedy

(57) ABSTRACT

A pivot unit includes a housing and a drive motor moveably connected to the housing. The drive motor includes a cylinder housing at least partially defining a cylinder bore. A piston is disposed within the cylinder bore. A first piston rod has a proximal end attached to a first side of the piston and a distal end attached to the housing. The cylinder housing is moveable along the first piston rod relative to the piston and the housing between a first cylinder housing position and a second cylinder housing position. A drive linkage is fixedly attached to the cylinder housing for concurrent movement with the cylinder housing relative to the piston and the housing.

16 Claims, 4 Drawing Sheets

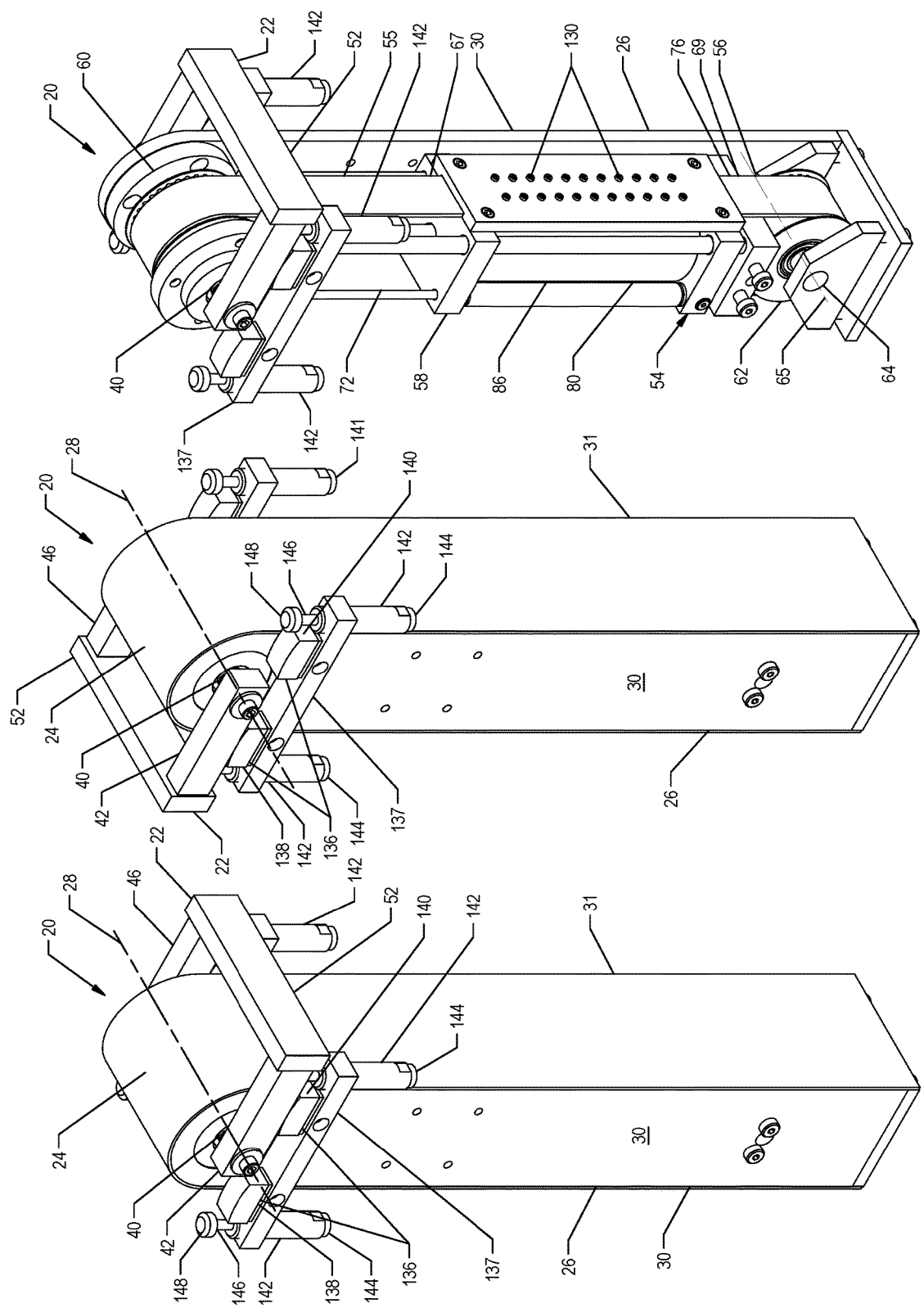

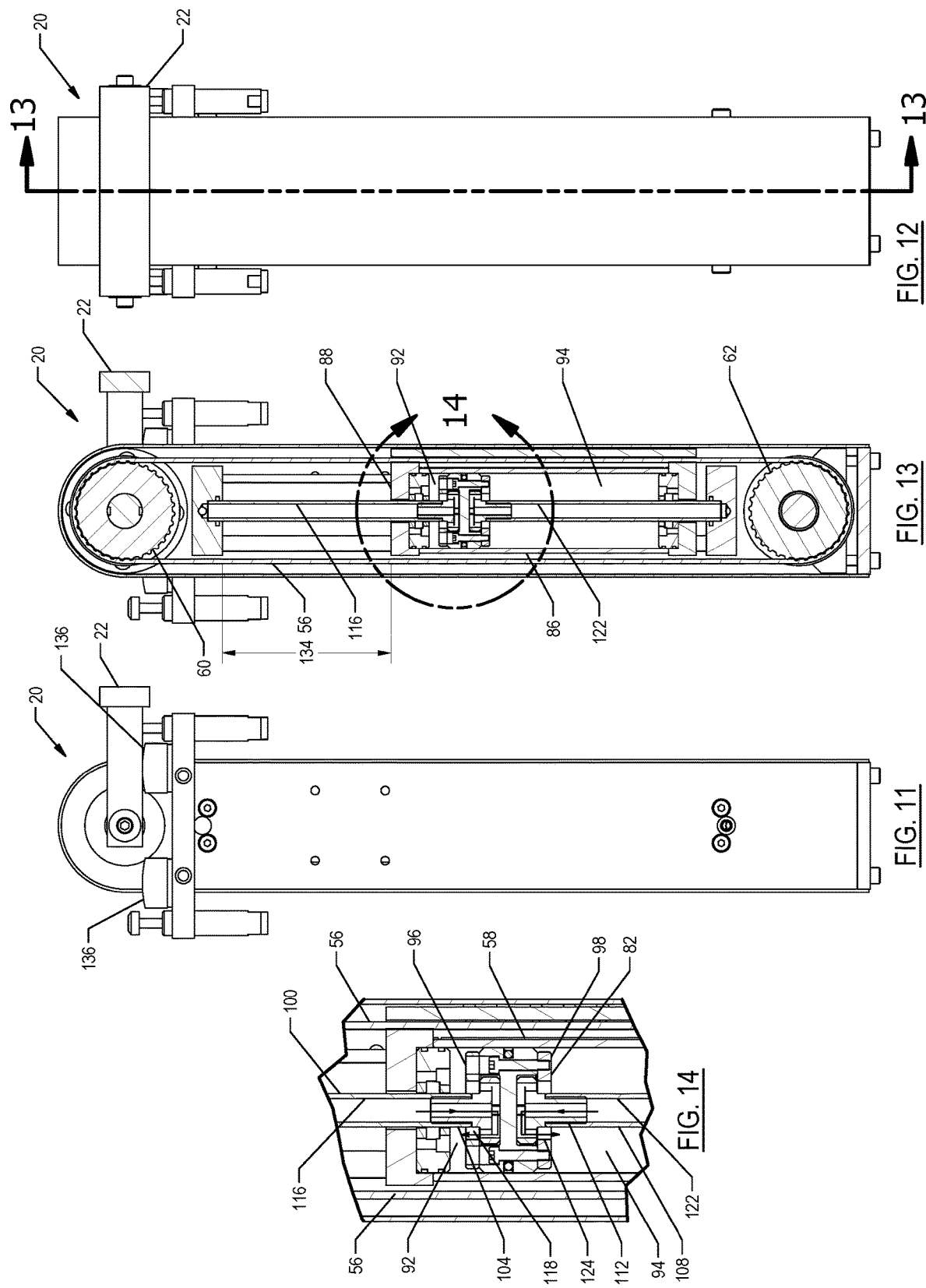

PIVOT UNIT

RELATED APPLICATIONS

This application claims the benefit of U.S. Provisional Application No. 62/539,789, entitled Pneumatic Pivot Unit, filed on Aug. 1, 2017, which is herein incorporated by reference in its entirety.

BACKGROUND

Pivot units are employed in various manufacturing operations to position parts and/or tooling at a desired work position. The pivot unit may be used, for example, to tip, dump and/or rotate parts and tooling to the work position. They may be used in applications that require accurate repeatability. The pivot unit may include a rotatable pivot head to which the parts and/or tooling may be attached. An actuator may be used to control movement of the pivot head. The actuator may be operated to successively cycle the pivot head between operating positions. The actuator may have various configurations, and may include pneumatic, hydraulic and/or electro-mechanical devices.

SUMMARY

Disclosed herein is a pivot unit that may operate to selectively move a component, such as a manufacturing tool, between alternate positions. The manufacturing tool may be attached to a pivot head pivotally connected to a housing of the pivot unit. The pivot head may be selectively pivoted around a pivot axis relative to the housing between a first pivot head position and a second pivot head position. The first pivot head position may be used, for example, to position the manufacturing tool relative to a workpiece to enable the manufacturing tool to perform a manufacturing operation on the workpiece. Upon completing the operation, the manufacturing tool may be moved away from the workpiece by pivoting the pivot head from the first pivot head position to the second pivot head position.

The pivot unit may include a drive motor moveably connected to the housing. The drive motor may include a cylinder housing defining a cylinder bore. A piston may be disposed within the cylinder bore. The position of the piston is fixed relative to the housing. The drive motor may include a piston rod having one end attached to the piston and an opposite end attached to the housing. The cylinder housing may be moved along the piston rod relative to the piston and the housing between a first cylinder housing position and a second cylinder housing positron. A drive linkage may be used to connect the cylinder housing to the pivot head. The drive linkage may be fixedly attached to the cylinder housing for concurrent movement therewith. The drive linkage operates in conjunction with the drive motor to move the pivot head pivot head between operating positions in response to movement of the cylinder housing between the first and second cylinder housing positions.

BRIEF DESCRIPTION OF THE DRAWINGS

The various features, advantages and other uses of the present apparatus will become more apparent by referring to the following detailed description and drawings, in which:

FIG. 1 is a perspective view of a pivot unit with a pivot head arranged in a first position;

FIG. 2 is a perspective view of the pivot unit the pivot head arranged in a second position;

FIG. 7 is a perspective view of the pivot unit with the pivot head arranged in a first position and a portion of the housing removed for clarity;

FIG. 11 is a side elevational view of the pivot unit with the pivot head arranged in the second position;

FIG. 12 is a rear elevational view of the pivot unit with the pivot head arranged in the second position;

FIG. 13 is partial cross-sectional view of the pivot unit taken along section line 13-13 in FIG. 12, with the pivot head arranged in the second position; and FIG. 14 is a partial cross-sectional view of the pivot unit taken along section line 14 in FIG. 13.

DETAILED DESCRIPTION

Figure 5:
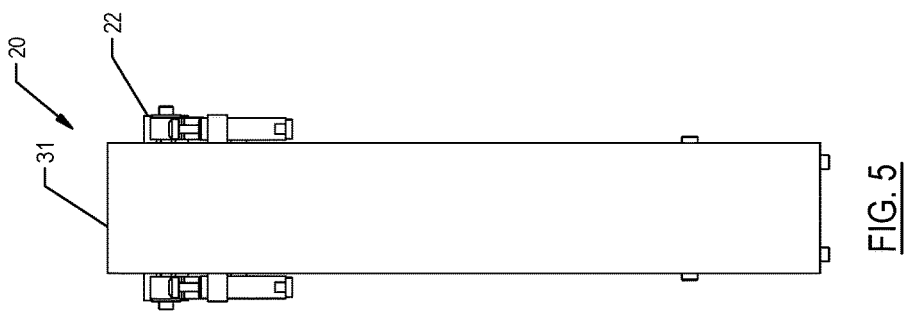
FIG. 5 is a rear elevational view of the pivot unit with the pivot head arranged in the first position.
Figures 3, 6:
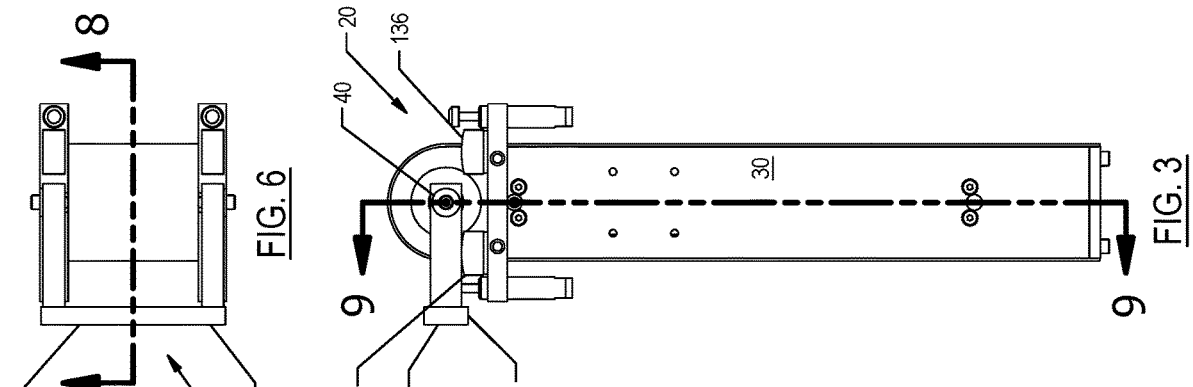
FIG. 3 is a side elevational view of the pivot unit with the pivot head arranged in the first position.
FIG. 6 is a top elevational view of the pivot unit with the pivot head arranged in the first position.
Figure 4:
FIG. 4 is a front elevational view of the pivot unit with the pivot head arranged in the first position.

Referring now to the discussion that follows and the drawings, illustrative approaches to the disclosed systems and methods are described in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIGS. 1 and 2, a pivot unit 20 may operate to selectively move a component, such as a manufacturing tool, between alternate positions. The manufacturing tool may be attached to a pivot head 22 pivotally connected to a proximal end 24 of a housing 26. The pivot head 22 may be selectively pivoted around a pivot axis 28 relative to the housing 26 between a first pivot head position, as illustrated, for example, in FIG. 1, and a second pivot head position, as illustrated for example, in FIG. 2. The first pivot head position may be used, for example, to position the manufacturing tool relative to a workpiece to enable the manufacturing tool to perform a manufacturing operation on the workpiece. Upon completing the operation, the manufacturing tool may be moved away from the workpiece by pivoting the pivot head 22 from the first pivot head position to the second pivot head position.

With reference to FIGS. 1 and 3-9, the housing 26 may include a pair of spaced apart housing sidewalls 30. Extending between the housing sidewalls 30 is a cover 31. With specific reference to FIGS. 8 and 9, the housing sidewalls 30 may be securely attached to one or more support members 32 positioned between the housing sidewalls 30. The support members 32 may be securely attached to the housing sidewalls 30 to define a spacing between the housing sidewalls 30. The support members 32 may include a first support member 34 located near the proximal end 24 of the housing 26 and a second support member 36 may be located near a distal end 38 of the housing 26 opposite the proximal end 24. The first support member 34 may be spaced inboard a distance from the proximal end 24 of the housing 26 and the second support member 36 may be spaced inboard a distance from the distal end 38 of the housing 26.

The pivot head 22 may be fixedly attached to a pivot shaft 40 that extends through the housing sidewalls 30. The pivot head 22 may rotate concurrently with the pivot shaft 40. The pivot shaft may be supported on bearings 41 mounted in apertures 43 formed in the housing sidewalls 30. Alternatively, the pivot shaft 40 may be fixedly attached to the housing 26 and the pivot head 22 may be rotatably attached to the pivot shaft 40.

Figure 9:
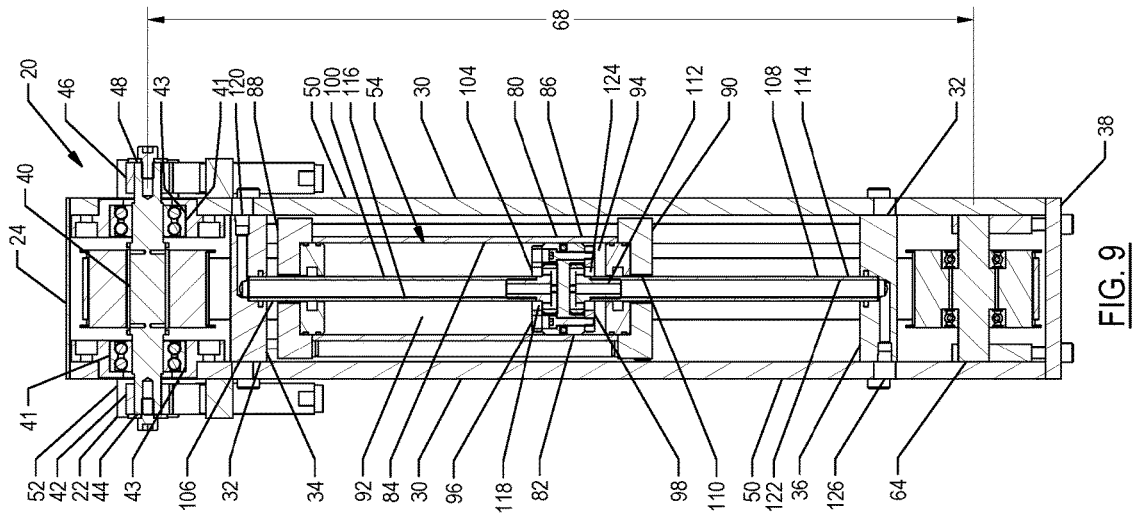
FIG. 9 is partial cross-sectional view of the pivot unit taken along section line 9-9 in FIG. 3, with the pivot head arranged in the first position.

With reference to FIG. 9, the pivot head 22 may include a first pivot arm 42 secured to a first end 44 of the pivot shaft 40 and a second pivot arm 46 secured to a second end 48 of the pivot shaft 40 opposite the first end 44. The first and second pivot arms 42,46 may be spaced apart from an outside surface 50 of the housing sidewalls 30 to avoid interference between the housing 26 and the pivot head 22 when pivoting the pivot head 22 between the first and second pivot head positions.

With reference to FIGS. 1-4, the pivot head 22 may include a mounting plate 52 securely attached to the first and second pivot arms 42,46. The mounting plate 52 may provide an attachment point for connecting various components, such as manufacturing tools, to the pivot unit 20. The mounting plate 52 may be suitably configured to interface with a corresponding connector on the attached component.

Figure 8:
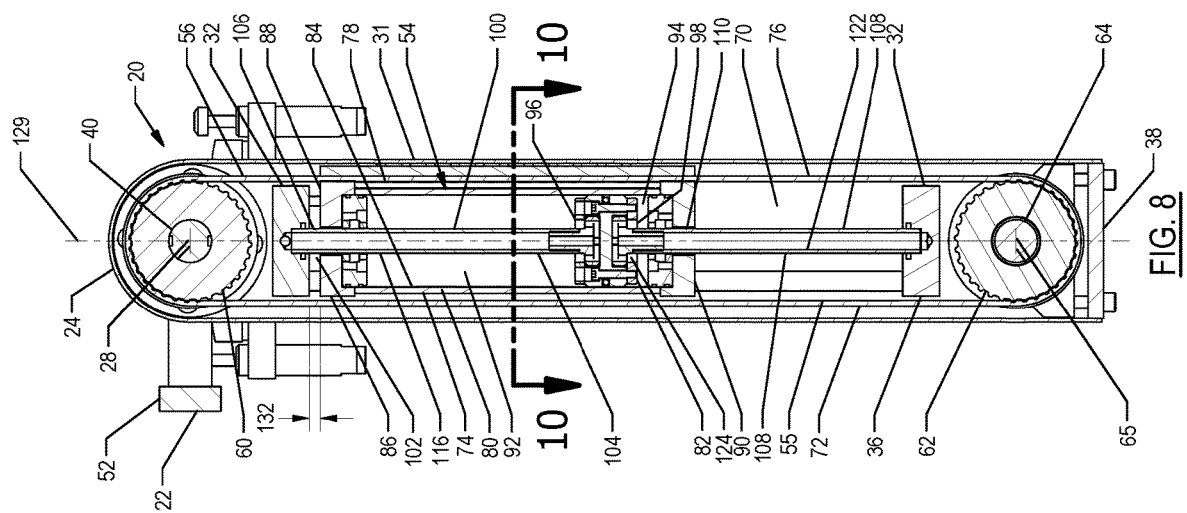
FIG. 8 is partial cross-sectional view of the pivot unit taken along section line 8-8 in FIG. 6, with the pivot head arranged in the first position.

With reference to FIGS. 7-9, the pivot unit 20 may include a drive mechanism 54 operable for moving the pivot head 22 between the first and second pivot head positions. The drive mechanism 54 may employ a drive linkage 55 powered by a drive motor 58 for moving the pivot head 22 between its various operating positions. The drive motor is moveable relative to the housing 26. The drive linkage 55 may be fixedly attached to the drive motor 58 to move concurrently therewith.

The drive linkage 55 may be configured as a drive belt 56. The drive belt 56 may engage a drive pulley 60 fixedly attached to the pivot shaft 40 and an idler pulley 62 attached to an idler shaft 64. The drive pulley 60 may be rotated about the pivot axis 28 and the idler pulley 62 may be rotated about an idler axis of rotation 65. The idler shaft 64 may be supported on bearings mounted in apertures formed in the housing sidewalls 30. The pivot axis 28 and the idler axis of rotation 65 may be spaced from one another by a pulley spacing 68. The drive pulley 60 may be located near the proximate end 24 of the housing 26 and the idler pulley 62 may be located near the distal end 38 of the housing 26. The support members 32 may be located between the drive pulley 60 and the idler pulley 62. The drive motor 58 may be located between the drive pulley 60 and the idler pulley 62.

The drive belt 56 may be wrapped taught around the drive pulley 60 and the idler pulley 62. An end 67 of the drive belt 56 may be fixedly attached to the drive motor 58 and an opposite end 59 may be similarly attached to the drive motor 58. Alternatively, the drive belt 56 may be configured as a continuous uninterrupted loop, with a portion of the drive belt 56 fixedly attached to the drive motor 58. Tension on the drive belt 56 may be varied by adjusting the pulley spacing 68 (i.e., spacing between the pivot axis 28 and the idler axis of rotation 65) between the drive pulley 60 and the idler pulley 62. The tension may be increased by increasing the pulley spacing 68 and decreased by decreasing the pulley spacing 68.

The drive linkage 55 may have various configurations. For example, the drive linkage 55 may be configured as the drive belt 56, which may be a flexible belt or a chain. The drive belt 56 may be constructed as a v-belt, round belt, or flat belt, as well as another configuration. The drive belt 56 may include teeth, cogs, or other features that engage corresponding features on the drive pulley 60 to enhance power transfer between the drive belt 56 and the drive pulley 60. The drive belt 56 may also be configured as a chain and the drive pulley 60 and the idler pulley 62 as sprockets. The chain may engage teeth on the sprockets to move the pivot head between its operating positions (i.e., between the first pivot head position and the second pivot head position).

With reference to FIG. 8, power for driving the drive belt 56 may be provided by the drive motor 58. The drive motor 58 may be located in the housing 26 between the first support member 34 and the second support member 36 and within a center region 70 encircled by the drive belt 56. Alternatively, the drive motor 58 may be located outside of the center region 70 and adjacent the drive belt 56, although this location may increase a size of the pivot unit 20. A first portion 72 of the drive belt extending between the drive pulley 60 and the idler pulley 62 may be located along a first side 74 of the drive motor 58 and a second portion 76 of the drive belt 56 extending between the drive pulley 60 and the idler pulley 62 is located along an opposite second side 78 of the drive motor 58. One of either the first or second portions 72,76 of the drive belt 56 may be attached to the drive motor 58, with the remaining portion being detached from the drive motor 58. In the illustrated example, the second portion 76 of the drive belt 56 is fixedly attached to the second side 78 of the drive motor 58 and the first portion 72 of the drive belt 56 is detached from the first side 74 of the drive motor 58. Alternatively, the first portion 72 of the drive belt 56 may be attached to the first side 74 of the drive motor 58 and the second portion 76 of the drive belt 56 may be detached from the second side 78 of the drive motor 58. In any event, only one portion of the drive belt 56 (either the first portion 72 or second portion 76) is attached to the respective side of the drive motor 58, with the remaining portion of the drive belt 56 being detached from the drive motor 58.

The drive motor 58 may include various configurations to suit a particular application. For example, the drive motor 58 may be configured as a hydraulic cylinder, pneumatic cylinder, electro-mechanical actuator, such as a solenoid, or any other configuration capable of transmitting a driving force to the drive linkage 55. For purposes of discussion, the drive motor 58 is depicted in the illustrated example as a pneumatic cylinder 80, but as previously indicated, may also include a different configuration.

With reference to FIGS. 8, 9 and 14, the pneumatic cylinder 80 may include a piston 82 located within a cylinder bore 84 formed in a cylinder housing 86. The cylinder housing 86 is moveable relative to the piston 82. The cylinder housing 86 may include a first endwall 88 located adjacent the first support member 34 and a second endwall 90 located adjacent the second support member 36. The piston 82 divides the cylinder bore 84 into two separate cylinders, a first cylinder 92 and a second cylinder 94. The first cylinder 92 may be defined by the cylinder bore 84, first endwall 88 and a first side 96 of the piston 82. The second cylinder 94 may be defined by the cylinder bore 92, second endwall 90 and a second side 98 of the piston 82. The first and second sides 96,98 of the piston 82 are located on opposite sides of the piston 82.

The pneumatic cylinder 80 may include a pair of piston rods attached to opposite sides of the piston 82. A first piston rod 100 may extend through an aperture 102 formed in the first endwall 88 of the cylinder housing 86. A proximal end 104 of the first piston rod 100 may be attached to the first side 96 of the piston 82 and a distal end 106 of the first piston rod 100 may be fixedly attached to the first support member 34. A second piston rod 108 may extend through an aperture 110 formed in the second endwall 90 of the cylinder housing 86. A proximal end 112 of the second piston rod 108 may be attached to the second side 98 of the piston 82 and a distal end 114 of the second piston rod 108 may be fixedly attached to the second support member 36. The first piston rod 100 and the second piston rod 108 may be oriented such that a longitudinal axis 129 of the first and second piston rods 100,108 intersects the pivot axis 28 and the idler pivot axis 65. The drive motor 58, including the cylinder housing 86, may be moved along first piston rod 100 and the second piston rod 108 relative to the housing 26 and the pivot axis 28, whereas the location of the piston 82 is fixed relative to the housing 26 and the pivot axis 28.

The first and second piston rods 100,108 may each include an interior passage for supplying a stream of pressurized fluid to the respective cylinder bores. The pressurized fluid may be in the form of a gas, such as compressed air, a liquid, such as hydraulic fluid, or a combination thereof. The first piston rod 100 may include a first supply passage 116 that extends a length of the first piston rod 100. Apertures 118 fluidly connect the first supply passage 116 to the first cylinder 92. It shall be understood the term "fluidly connected" means a fluid (i.e., a gas and/or liquid) may flow between the fluidly connected components. The first supply passage 116 may be fluidly connected to a first inlet passage 120 formed in the first support member 34. The first inlet passage 120 may be fluidly connected to a source of pressurized fluid.

The second piston rod 108 may include a second supply passage 122 that extends a length of the second piston rod 108. Apertures 124 fluidly connect the second supply passage 122 to the second cylinder 94. The second supply passage 122 may be fluidly connected to a second inlet passage 126 formed in the distal support member. The second inlet passage 126 may be fluidly connected to a source of pressurized fluid.

Figure 10:
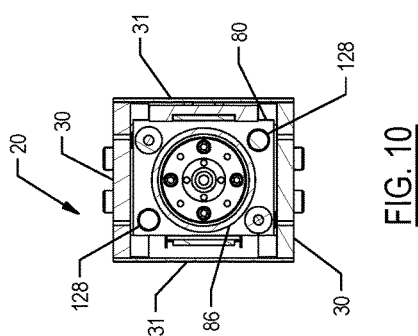
FIG. 10 is partial cross-sectional view of the pivot unit taken along section line 10-10 in FIG. 8, with the pivot head arranged in the first position.

In addition to supplying pressurized fluid to the respective cylinders, the first and second supply passages 116,122 may also be used to discharge pressurized fluid from the respective cylinders. A control valve may be used to alternately connect the first and second supply passages 116,122 to a source of pressurized fluid and/or a collection reservoir. The collection reservoir may be atmosphere. Alternately, separate passages may be used to vent the first and second cylinders 116,122 to atmosphere. With reference to FIGS. 8 and 10, the cylinder housing 86 may be slideably attached to one or more sliderails 128. The slide rails 128 may be fixedly attached to the housing 26 of the pivot unit 20. The sliderails 128 may be oriented generally parallel to the longitudinal axis 129 of the first and second piston rods 100,108. The sliderails 128 enable to drive motor 58 and cylinder housing 86 to move along a length of the sliderails 128 relative to the housing 26 and the pivot axis 28.

With reference to FIGS. 7 and 8, in the illustrated example, the second portion 76 of the drive belt 56 is fixedly attached to the cylinder housing 86 of the pneumatic cylinder 80 and the first portion 72 of the drive belt 56 is detached from the cylinder housing 80. Alternatively, the first portion 72 of the drive belt 56 may be attached to the cylinder housing 86 of the pneumatic cylinder 80 and the second portion 76 of the drive belt 56 detached from the cylinder housing 86. Various attachment mechanisms may be used to secure the cylinder housing 86 to the drive belt 56, such as, for example, bolts, screws 130 and rivets, as well as other fastening mechanisms, such as welding, brazing and adhesives.

With reference to FIGS. 1 and 2, the pivot unit 20 may include one or more pairs of pivot stops 136 attached to the housing sidewall 30. The pivot stops 136 may attached to a pivot stop mounting bar 137 that may itself be attached to the housing sidewall 30. Alternatively, the pivot stops 136 may be directly attached to the housing sidewall 30. The pairs of pivot stops 136 may engage the first pivot arm 42 and/or second pivot arm 46 to limit pivoting movement of the pivot head 22. A single pair of pivot stops 136 may be located on one side of the pivot unit 20 or a pair of pivot stops 136 may be attached to opposite sides of the pivot unit 20. Each pair of pivot stops 136 may include a first pivot stop 138 for controlling a position of the pivot head 22 when arranged in the first position and a second pivot stop 140 for controlling a position of the pivot head 22 when arranged the second position.

The range of motion of the pivot head 22 may be selectively adjusted by varying a location of the first and second pivot stops 138,140 relative to the pivot shaft 40. For example, moving a location of the first pivot stop 138 and/or second pivot stop 140 upward (as viewed from the perspective of FIGS. 1 and 2) reduces the range of motion of the pivot head 22, whereas moving the location of the first pivot stop 138 and/or second pivot stop 140 downward (as viewed from the perspective of FIGS. 1 and 2), increases the range of motion of the pivot head 22. The pivot stop mounting bar may be attached to the housing sidewall using a releasable fastener, such as a bolt or screw, to enable the location of the first pivot stop 138 and/or second pivot stop 140 to be adjusted for controlling the range of motion of the pivot head 22. In instances where the pivot stops 136 are attached directly to the housing sidewall 30, the pair of pivot stops 136 may similarly be attached directly to the housing sidewall 30 using a releasable fastener, such as a bolt or screw, to enable the location of the first pivot stop 138 and/or second pivot stop 140 to be adjusted for controlling the range of motion of the pivot head 22.

The pivot unit may include a damper 142 that may be used to control deceleration of the pivot head 22 as it approaches the end of its range of motion. The damper 142 may be attached to the pivot stop mounting bar 137. Alternatively, the damper 142 may be attached to another location on the housing 26.

The damper 142 may include a plunger 146 slideably attached to a damper housing 144. An end 148 of the plunger 146 may engage the first pivot arm 42 and/or second pivot arm 46 as the pivot head 22 approaches the end of its range of motion.

The damper 142 may employ various damping mechanisms. For example, the damper 142 may include a biasing member, such as a spring, attached to the plunger 146. The biasing member may compress when the pivot head 22 contacts the plunger 146 to decelerate the pivot head 22 prior to contacting the pivot stop 136. The damper 142 may also employ various other damping mechanisms that may include, for example, hydraulic, pneumatic and electromechanical mechanisms.

With reference to FIGS. 8 and 11-13, the pivot head 22 may be sequentially pivoted back and forth between the first pivot head position, as illustrated for example, in FIG. 8, and the second pivot head position, as illustrated, for example, in FIG. 13. With the pivot head 22 initially positioned in the first pivot head position (see, for example, FIG. 8), the pivot head 22 may be moved to the second pivot head position by pressurizing the second cylinder 94 while simultaneously depressurizing the first cylinder 92. This may be accomplished by supplying pressurized fluid to the second cylinder 94 through the second supply passage 122 while simultaneously allowing fluid present in the first cylinder 92 to be discharge through the first supply passage 116. This causes the cylinder housing 86 to move toward the idler pulley 62 and away from the drive pulley 60, which in turn causes the drive belt 56, which is attached to the cylinder housing 86, to rotate the pivot head 22, via the drive pulley 60, toward the second pivot head position (as illustrated, for example, in FIG. 8).

The pivot head 22 may be moved from second pivot head position (see, for example, FIG. 13) to the first pivot head position (see, for example, FIG. 8) by pressurizing the first cylinder 92 while simultaneously depressurizing the second cylinder 94. This may be accomplished by supplying pressurized fluid to the first cylinder 92 through the first supply passage 116 while simultaneously allowing fluid present in the second cylinder 94 to be discharge through the second supply passage 122. This causes the cylinder housing 86 to move toward the drive pulley 60 and away from the idler pulley 62, which in turn causes the drive belt 56 to rotate pivot head 22, via the drive pulley 60, toward the first pivot head position.

With continued reference to FIGS. 8 and 13, the first endwall 88 of the cylinder housing 86 may be positioned a first distance 132 from the first support member 34 when the pivot head 22 is in the first pivot head position and a second distance 134 from the first support member 34 when the pivot head 22 is in the second pivot head position. The first distance 132 being less than the second distance 134. Moving the cylinder housing 86 away from the drive pulley 60 and toward the idler pulley 62 causes the pivot head 22 to move away from first pivot head position and toward the second pivot head position. Moving the cylinder housing 86 toward the drive pulley 60 and away from the idler pulley 62 causes the pivot head 22 to move away from the second pivot head position and toward the first pivot head position.

It is intended that the scope of the present methods and apparatuses be defined by the following claims. However, it must be understood that the various disclosed configurations and operation of the pivot unit may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

The invention claimed is:

1. A pivot unit comprising:
   a housing;
   a drive motor comprising:
      a cylinder housing at least partially defining a cylinder bore;
      a piston disposed within the cylinder bore; and
      a first piston rod having a proximal end attached to a first side of the piston and a distal end attached to the housing, the cylinder housing moveable along the first piston rod relative to the piston between a first cylinder housing position and a second cylinder housing position;
   a drive linkage fixedly attached to the cylinder housing for concurrent movement therewith;
   a pivot head connected to the drive linkage, the pivot head rotatable about a pivot axis relative to the housing between a first pivot head position and a second pivot head position in response to movement of the cylinder housing between the first cylinder housing position and the second cylinder housing position; and
   a second piston rod have a proximal end fixedly attached to a second side of the piston opposite the first side of the piston and a distal end fixedly attached to the housing, wherein the cylinder housing is moveable along the second piston rod between the cylinder housing first position and the cylinder housing second position.

2. A pivot unit comprising:
   a housing;
   a drive motor comprising:
      a cylinder housing at least partially defining a cylinder bore;
      a piston disposed within the cylinder bore; and
      a first piston rod having a proximal end attached to a first side of the piston and a distal end attached to the housing, the cylinder housing moveable along the first piston rod relative to the piston between a first cylinder housing position and a second cylinder housing position;
   a drive linkage fixedly attached to the cylinder housing for concurrent movement therewith;
   a pivot head connected to the drive linkage, the pivot head rotatable about a pivot axis relative to the housing between a first pivot head position and a second pivot head position in response to movement of the cylinder housing between the first cylinder housing position and the second cylinder housing position; and
   a drive pulley attached to the pivot head for concurrent rotation therewith about the pivot axis, the drive linkage comprising a drive belt engaging the drive pulley, the drive belt fixedly connected to the cylinder housing so as to move in unison with the cylinder housing relative to the piston.

3. The pivot unit of claim 2, wherein the cylinder housing is spaced a first distance from the pivot axis when located in the first cylinder housing position and spaced a second distance from the pivot axis when located in the second cylinder housing position, the second distance being greater than the first distance.

4. The pivot unit of claim 2 further comprising an idler pulley rotatably connected to the housing and spaced a fixed distance from the drive pulley, the drive belt simultaneously engaging the idler pulley and the drive pulley, wherein the cylinder housing is disposed between the drive pulley and the idler pulley, the cylinder housing being spaced a first cylinder housing distance from the pivot axis when located in the first position and spaced a second cylinder housing distance from the pivot axis when located in the second position, the second distance being greater than the first distance.

5. The pivot unit of claim 2, wherein the drive belt includes a first portion oriented substantially parallel to a longitudinal axis of the first piston and a second portion oriented substantially parallel to the longitudinal axis of the first piston, the cylinder housing located between the first and second portions of the drive belt.

6. The pivot unit of claim 2 further comprising a slide rail fixedly attached to the housing, wherein the cylinder housing is moveable along the slide rail between the cylinder housing first position and the cylinder housing second position.

7. A pivot unit comprising:
a housing;
a slide rail attached to the housing;
a drive motor slidably attached to the slide rail, the drive motor moveable along the slide rail relative to the housing between a first drive motor position and a second drive motor position; and
a drive linkage attached to the drive motor, wherein the drive linkage moves in unison with the drive motor.

8. The pivot unit of claim 7, wherein the drive motor comprises:
a cylinder housing comprising a cylinder bore;
a piston moveably disposed within the cylinder bore; and
a first piston rod having a proximal end fixedly attached to the piston and a distal end fixedly attached to the housing, the cylinder housing moveable relative to the piston and the housing.

9. The pivot unit of claim 8, wherein a position of the piston is fixed relative to the housing.

10. The pivot unit of claim 9, wherein the first piston rod includes a first supply passage fluidly connected to the cylinder bore for delivering a pressurized fluid to the cylinder bore.

11. The pivot unit of claim 10 further comprising a second piston rod having a proximal end fixedly attached to the piston and a distal end fixedly attached to the housing, the second piston rod including a second supply passage fluidly connected to the cylinder bore for delivering the pressurized fluid to the cylinder bore.

12. The pivot unit of claim 11, wherein the first piston rod is attached to a first side of the piston and the second piston rod is attached to a second side of the piston, the first side of the piston and the cylinder bore defining a first cylinder and the second side of the piston and the cylinder bore defining a second cylinder, the first supply passage fluidly connected to the first cylinder and the second supply passage fluidly connected to the second cylinder.

13. The pivot unit of claim 7 further comprising a pivot head connected to the drive linkage, the pivot head rotatable about a pivot axis relative to the housing between a first pivot head position and a second pivot head position in response to movement of the drive motor between the first drive motor position and the second drive motor position.

14. The pivot unit of claim 13 further comprising a drive pulley attached to the pivot head for concurrent rotation therewith about the pivot axis, the drive linkage comprising a drive belt engaging the drive pulley, the drive belt fixedly connected to the drive motor so as to move in unison with the drive motor.

15. The pivot unit of claim 14, wherein the drive motor is spaced a first distance from the pivot axis when located in the first position and spaced a second distance from the pivot axis when located in the second position, the second distance being greater than the first distance.

16. The pivot unit of claim 14 further comprising an idler pulley rotatably connected to the housing and spaced a fixed distance from the drive pulley, the drive belt simultaneously engaging the idler pulley and the drive pulley, wherein the drive motor is disposed between the drive pulley and the idler pulley, the drive motor being spaced a first distance from the pivot axis when located in the first position and spaced a second distance from the pivot axis when located in the second position, the second distance being greater than the first distance.

* * * * *